United States Patent [19]

Yamamoto et al.

[11] Patent Number: 5,689,580
[45] Date of Patent: Nov. 18, 1997

[54] PRINTED LETTER INSPECTING APPARATUS FOR SOLID OBJECTS

[75] Inventors: Taizo Yamamoto, Osaka; Hirokazu Konishi, Sakurai; Yoshihisa Kawaguchi, Kashihara; Akira Nagao, Tenri, all of Japan

[73] Assignee: Japan Elanco Company Limited, Osaka, Japan

[21] Appl. No.: 747,904

[22] Filed: Nov. 12, 1996

Related U.S. Application Data

[63] Continuation of Ser. No. 262,419, Jun. 20, 1994, abandoned.

[30] Foreign Application Priority Data

Jun. 21, 1993 [JP] Japan ................................ 5-149430

[51] Int. Cl.⁶ ......................................................... G06K 9/00
[52] U.S. Cl. ............................................... 382/143; 364/368
[58] Field of Search ................................. 382/101, 112, 382/141, 142, 209, 217, 218, 221; 364/468, 469

[56] References Cited

U.S. PATENT DOCUMENTS

| | | | |
|---|---|---|---|
| 4,013,999 | 3/1977 | Erwin et al. | 382/101 |
| 4,281,342 | 7/1981 | Ueda et al. | 358/93 |
| 4,778,062 | 10/1988 | Pavie et al. | 382/101 |
| 4,965,829 | 10/1990 | Lemelson | 382/101 |
| 4,972,494 | 11/1990 | White et al. | 382/141 |
| 5,253,306 | 10/1993 | Nishio | 382/112 |
| 5,311,599 | 5/1994 | Freischlad | 382/141 |
| 5,327,252 | 7/1994 | Tsuruoka et al. | 382/112 |
| 5,365,596 | 11/1994 | Dante et al. | 382/141 |
| 5,398,818 | 3/1995 | McGarvey | 382/141 |

FOREIGN PATENT DOCUMENTS 0 265 529  11/1987  European Pat. Off. .

*Primary Examiner*—Michael T. Razavi
*Assistant Examiner*—Jayanti K. Patel
*Attorney, Agent, or Firm*—Panitch Schwarze Jacobs & Nadel, P.C.

[57] ABSTRACT

A first, a second and a third RAMs 18, 29 and 34, which preliminarily have stored an absolute value of a difference between any combination of two digital signals issued from an A/D conversion means 3, are provided with first, second and third differential and coding circuit 5, 6 and 7, thereby performing a real-time processing of the digital signal for a printed letter inspecting apparatus for solid objects.

4 Claims, 9 Drawing Sheets

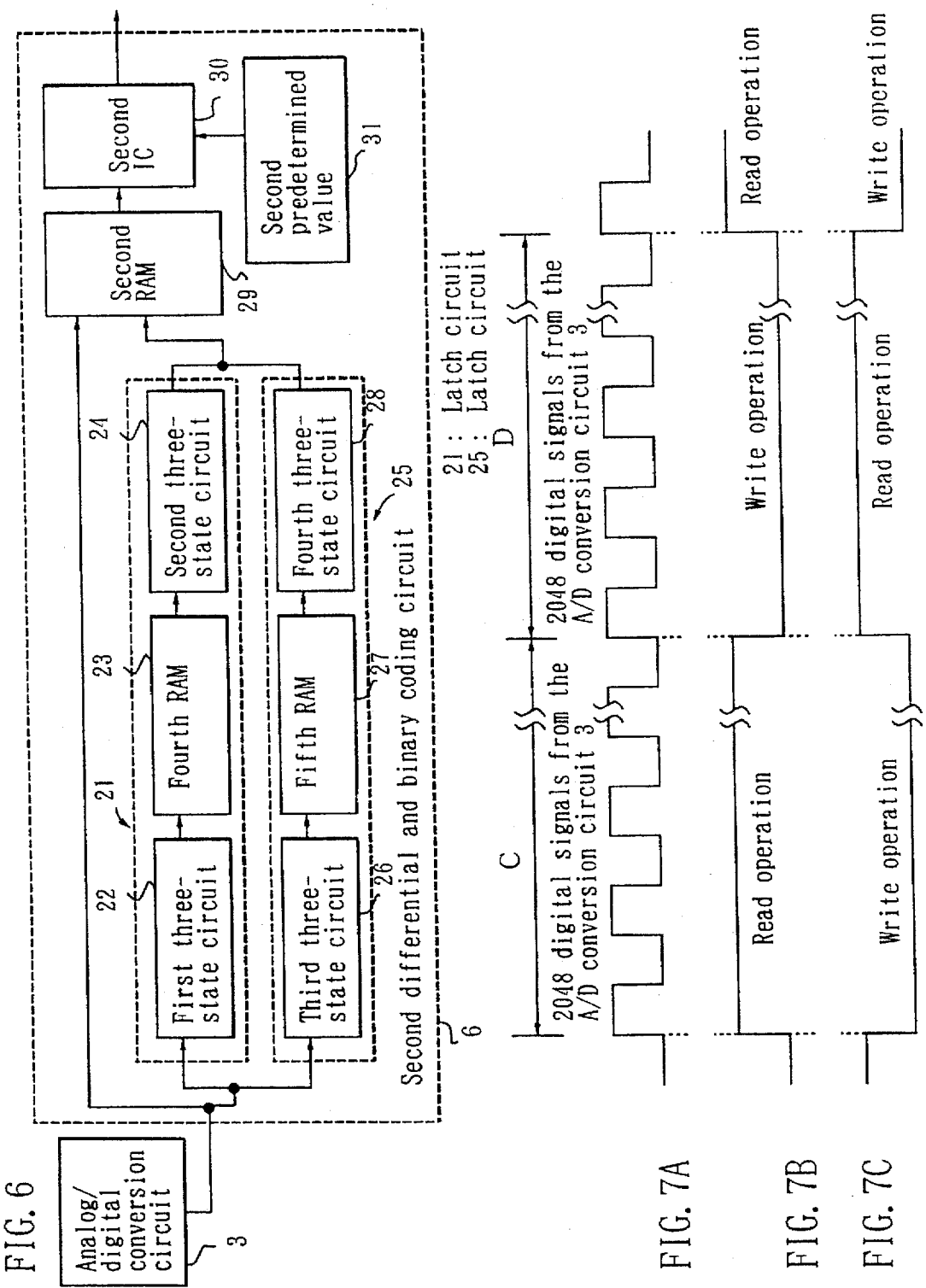

FIG. 8
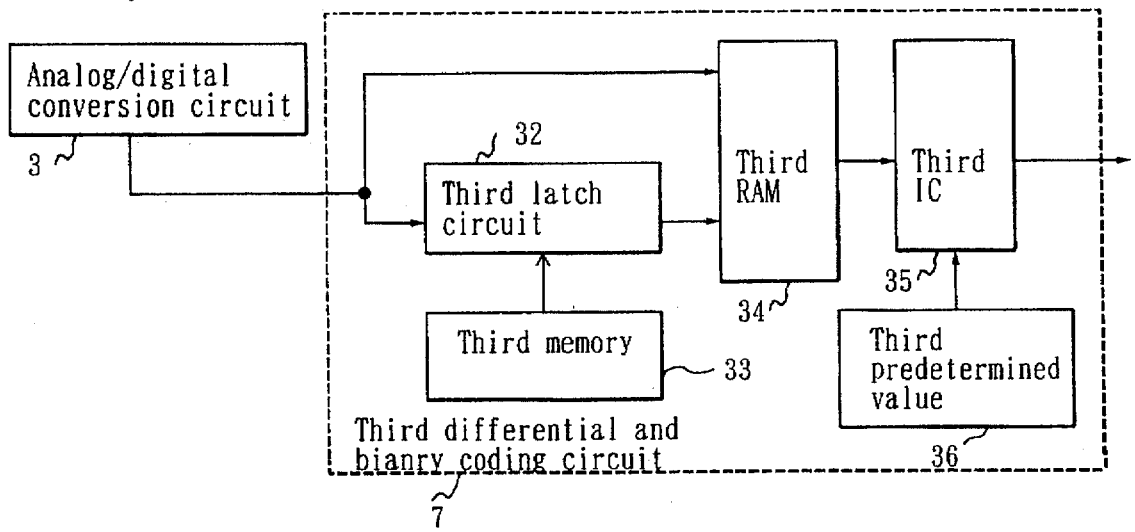
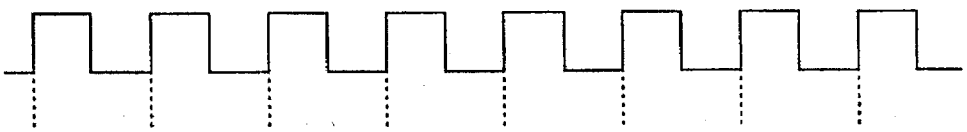
FIG. 9A
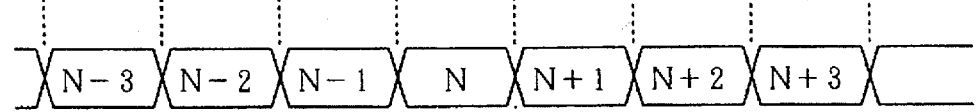
FIG. 9B
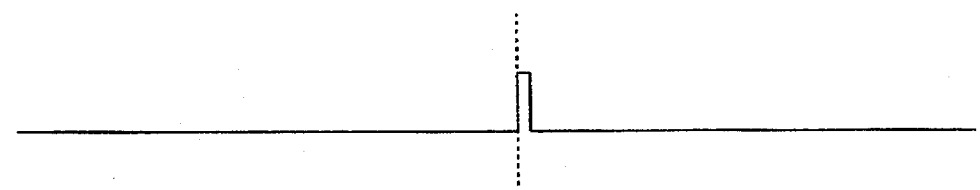
FIG. 9C
FIG. 9D FIG. 14
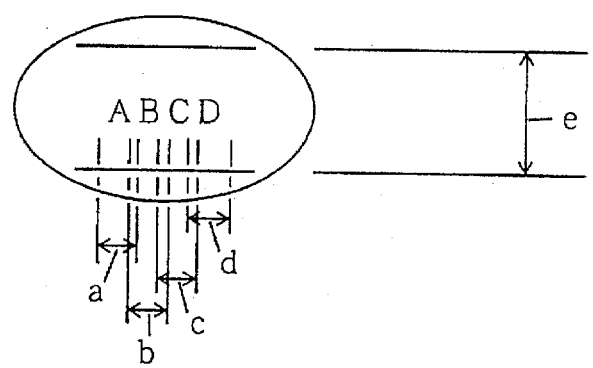
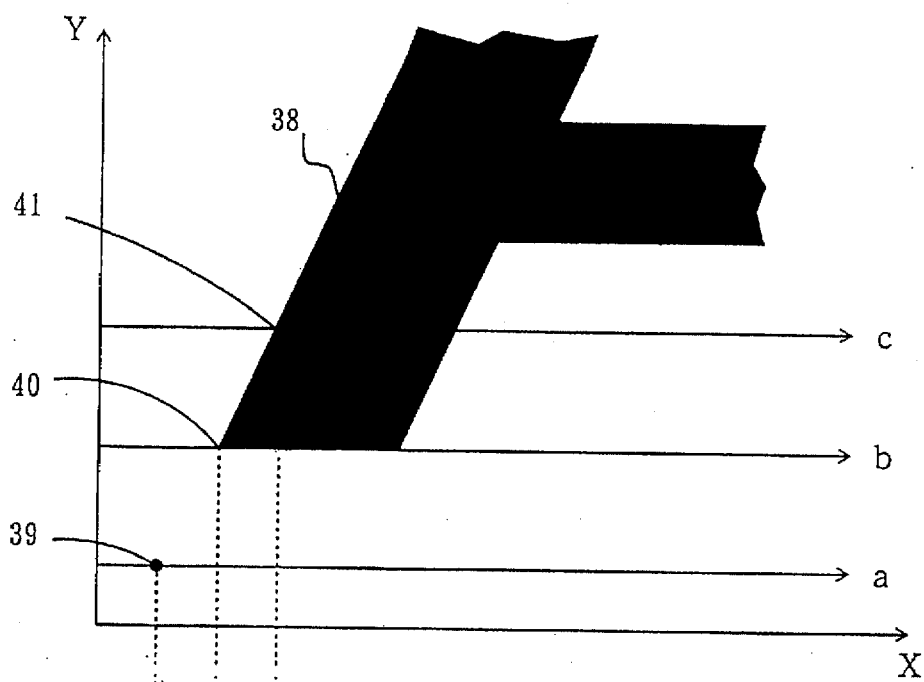
FIG. 15A
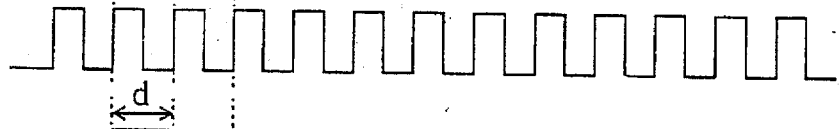
FIG. 15B
FIG. 15C
FIG. 15D
FIG. 15E

PRINTED LETTER INSPECTING APPARATUS FOR SOLID OBJECTS

This application is a continuation of application Ser. No. 08/262,419 filed on Jun. 20, 1994 now abandoned.

FIELD OF THE INVENTION AND RELATED ART STATEMENT

1. Field of the Invention

The present invention relates to an improvement of a printed letter inspecting apparatus which is to be used for inspecting printed letters of solid objects such as medicine tablets and medicine capsules.

2. Description of the Related Art

FIG. 16 is an explanatory drawing of an inspection process of a conventional printed letter inspecting apparatus for solid objects.

In this inspection process, the solid objects, for instance medicine tablets, are aligned and carried in a horizontal direction on a belt conveyer (not shown) and pass under a two-dimensional camera 60 such as a CCD camera. Generally plural, for example, four solid objects are disposed in widthwise rows, namely in a direction perpendicular to the carrying direction of the carrier, parallel to each other in a row.

As shown in FIG. 16, firstly, a surface of the solid object is scanned by the two-dimensional camera 60 which issues an analog signal showing reflectance on the surface of the solid object. The above-mentioned analog signal is inputted in an analog/digital conversion circuit 3 (hereinafter referred to as the A/D conversion circuit 3). The A/D conversion circuit 3 converts the analog signal given from the two-dimensional camera 60 into an 8-bit digital signal (hereinafter referred to as the digital signal), in which the reflectance is divided into 256 levels. The digital signal successively issues from the A/D conversion circuit 3 to a memory circuit 50. The memory circuit 50 stores the digital signals given from the A/D conversion circuit 3 at every predetermined range data of the digital signals, for example, data of the digital signals corresponding to one solid object.

Then, every predetermined range data of the digital signals are issued from the memory circuit 50 to a computer 120. The computer 120 performs a count process 51 at every predetermined range data of the digital signals.

The following three processes (a), (b) and (c) are conducted in the count process 51 of the computer 120 in order to improve the accuracy of inspection:

(a) The digital signal is compared with a predetermined value in turn, and the number of the digital signal exceeding the predetermined value is counted.

(b) Two digital signals, which are successively issued in a scanning direction of the two-dimensional camera 60, are compared with each other in turn. When an absolute value of a difference between the two digital signals is greater than another predetermined value, a signal is issued, and the number of the signal is counted.

(c) Two digital signals, which are generated in successive two scanning operation of the two-dimensional camera 60 in a carrying direction of the solid object, are compared with each other in turn. When an absolute value of a difference between the two digital signals is greater than another predetermined value, a signal is issued, and the number of the signal is counted.

In the above-mentioned processes (a), (b) and (c), the predetermined range data of the digital signals are issued from the memory circuit 50 to the computer 120 at every three processes (a), (b) and (c).

Subsequently, a comparing process 52 compares results of the above-mentioned processes (a), (b) and (c) with data of a letter pattern 53 in turn. In this letter pattern 53, the results of the above-mentioned processes (a), (b) and (c) in case that a letter is correctly printed on the surface of the solid object have preliminarily stored as data.

A judging process 54 judges a result of the comparing process 52 so that the printed letter of the solid object is decided between good printing and defective printing. If the judging process 54 judges the printed letter as defective printing, the judging process 54 issues a defective object rejecting signal to an output terminal 541 so that the solid object having defective printing is removed from the belt conveyer.

In the above-mentioned conventional printed letter inspecting apparatus for the solid object, it is necessary to provide the memory circuit 50 mainly composed of a RAM having a memory capacity, which is capable of storing the predetermined range data, in order to effectively perform the count process 51 of the computer 120.

Furthermore, in the above-mentioned three processes (a), (b) and (c), the predetermined range data of the digital signals issues from the memory circuit 50 to the computer 120 for every of the three processes (a), (b) and (c). Therefore, a processing time of the computer 120 becomes remarkably larger compared with a scanning time of the two-dimensional camera 60. For example, in aligned four solid objects, although the scanning time needs about 30 (msec), the processing time needs about 370 (msec). Thus, it is impossible to perform real-time processing for inspecting and judging the digital signals given from the A/D conversion circuit 3.

As a result, there is a problem that a speed of the belt conveyer is limited by the processing time. Hence, it is impossible to increase a productivity of the solid object.

OBJECT AND SUMMARY OF THE INVENTION

The object of the present invention is to provide a printed letter inspecting apparatus for solid objects that can solve the aforementioned problems.

In order to achieve the above-mentioned object, a printed letter inspecting apparatus for the solid objects in accordance with the present invention comprises:

surface scanning means disposed above a part of a carrier apparatus, which horizontally carries solid objects placed on a plane, the surface scanning means scanning a surface of the solid object in synchronism with a predetermined clock in one direction which is perpendicular to a carrying direction of the carrier apparatus in sufficiently fast rate in comparison with speed of carrying of the carrier, the surface scanning means issuing an analog signal in synchronism with the predetermined clock, analog/digital conversion means for converting the analog signal given from the surface scanning means into a digital signal in synchronism with the predetermined clock, at least one differential and coding means having a RAM for issuing an absolute value of a difference between two digital signals from the analog/digital conversion means in synchronism with the predetermined clock, the differential and coding means comparing the absolute value of the difference with a first predetermined value and issuing a coded signal in synchronism with the predetermined clock when the absolute value of the difference is greater than the predetermined value, and judging means each comprising an output circuit, a match number count circuit, an all-number count circuit and a total judging circuit;

the output circuit being for counting number of the coded signal and for issuing a preliminarily stored coded signals of letter pattern in synchronism with the predetermined clock when the number of the coded signal reaches a fourth predetermined value, the match number count circuit being for counting a match number between the coded signal from the differential and coding means and the preliminarily stored coded signals from the output circuit to issue an output signal in synchronism with the predetermined clock when the match number is greater than a fifth predetermined value, the all-number count circuit being for counting number of the coded signal from the differential and coding means to issue an output signal in synchronism with the predetermined clock when the number of the coded signal is smaller than a sixth predetermined value and, the total judging circuit being for issuing an output signal based on the output signals of the match number count circuit and the all-number count circuit.

In the printed letter inspecting apparatus for solid objects of the present invention, the surface scanning means performs a scanning process of the solid object; and the analog/digital conversion means, the differential and coding means, and the judging means perform an inspecting and judging process of the solid object eliminating from the computer 120 (FIG. 18) of the prior art. Therefore, it is not necessary to provide the memory circuit, which is mainly composed of a RAM, between the surface scanning means and the computer 120 (FIG. 18) of the prior art. Furthermore, in the inspecting and judging process of the solid object, each of the above-mentioned means performs the process in synchronism with the predetermined clock of the surface scanning means. Therefore, it is possible to reduce a scanning time of the scanning process and a processing time of the inspecting and judging process. For example, in aligned four solid objects, the scanning process and the inspecting and judging process can be performed about 140 (msec). As a result, it is possible to raise a speed of the belt conveyer. Hence, a productivity of the solid object can be increased.

BRIEF DESCRIPTION OF THE DRAWINGS

FIG. 6 is a block diagram showing a concrete structure of the second differential and binary coding circuit.

FIG. 7A is a wave form chart showing a clock signal of the line sensor camera.

FIG. 7B is a wave form chart showing a write and a read operations of a fourth RAM.

FIG. 7C is a wave form chart showing a write and a read operations of a fifth RAM.

FIG. 8 is a block diagram showing a concrete structure of the third differential and binary coding circuit.

FIG. 9A is a wave form chart showing a clock signal of the line sensor camera.

FIG. 9B is a wave form chart showing a digital signal issued from the A/D conversion circuit.

FIG. 9C is a wave form chart showing an instruction signal from a third memory.

FIG. 9D is a wave form chart showing a digital signal in a third latch circuit.

FIG. 14A is an explanatory drawing of four scanning coverage, which are defined by a second memory, for respective four output circuits.

FIG. 15A is an explanatory drawing of scanning operation of the line sensor camera for the printed letter "A".

FIG. 15B is a wave form chart showing the clock signal of the line sensor camera.

FIG. 15C is a wave form chart showing the third binary-coded signals in case that the line sensor camera scans on an arrow "a" shown in FIG. 15A.

FIG. 15D is a wave form chart showing the third binary-coded signals in case that the line sensor camera scans on an arrow "b" shown in FIG. 15A.

FIG. 15E is a wave form chart showing the third binary-coded signals in case that the line sensor camera scans on an arrow "c" shown in FIG. 15A.

DESCRIPTION OF THE PREFERRED EMBODIMENT

Hereafter, a preferred embodiment of the present invention is described with reference to the accompanying drawings.

Figure 1:
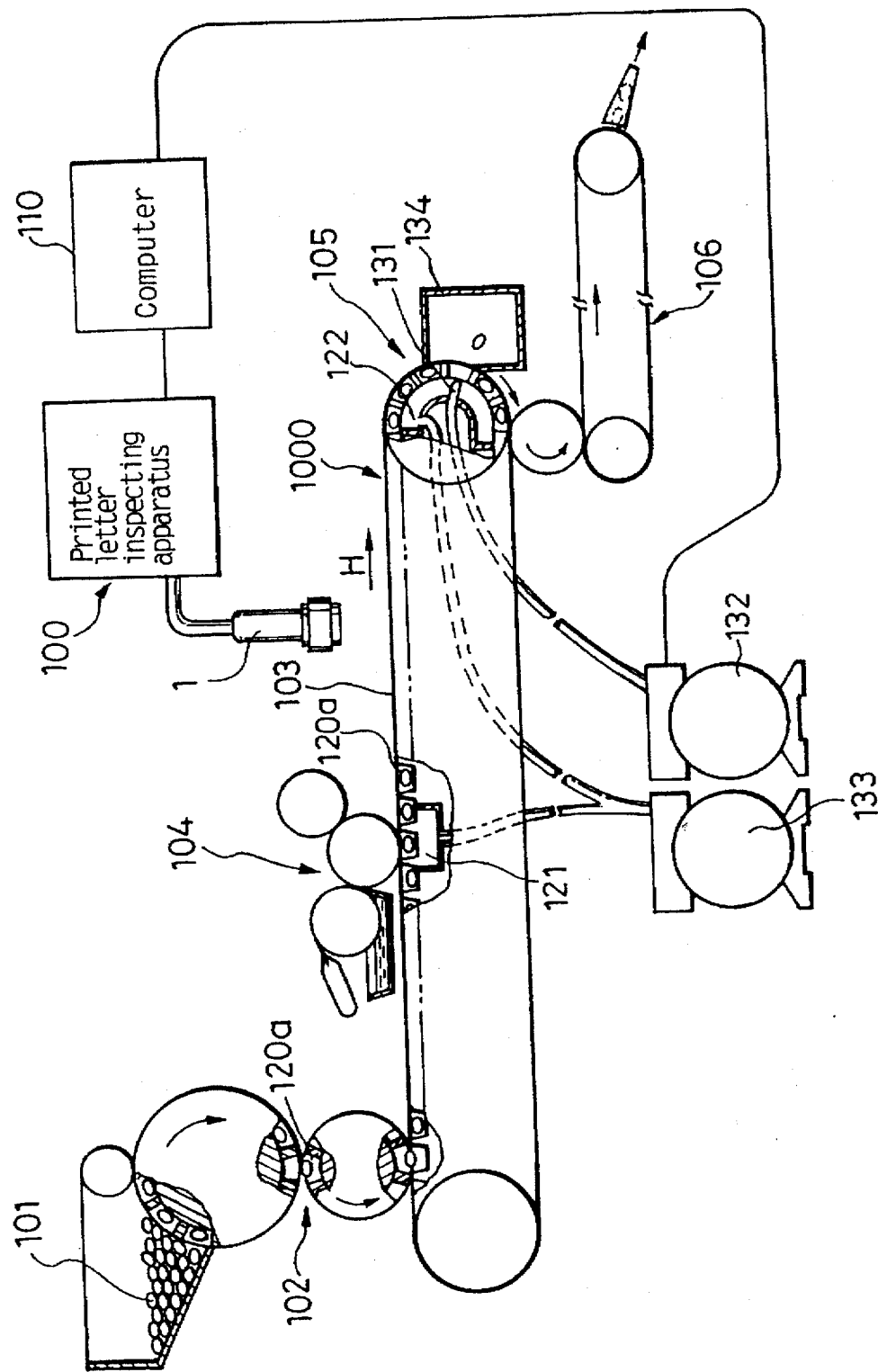
FIG. 1 is an explanatory drawing of an arrangement of a preferred embodiment of a printed letter inspecting apparatus for solid objects, for instance a medicine tablet, during printing and inspection process of the solid objects.

FIG. 1 is an explanatory drawing of an arrangement of a preferred embodiment of a printed letter inspecting apparatus for solid objects, for instance a medicine tablets, during printing and inspection process of the solid objects.

In this explanation of the preferred embodiment, a direction "X" is the direction which is perpendicular to and from the rear face of the sheet of FIG. 1, and a direction "Y" is the direction which is opposite to a carrying direction (shown in an arrow "H" of FIG. 1) of the solid object, for instance a medicine tablet, 101.

As shown in FIG. 1, the solid objects 101 are successively provided from a supply part 102 in a line to pockets 120a of a belt 103 of a belt conveyer 1000. The solid objects 101 are carried horizontally toward a letter printing part 104 by the belt 103. In the direction "X" a plurality of, for example four, solid objects 101 are disposed making a widthwise row.

The solid object 101 is printed with a predetermined pattern, for example, "ABCD" at the letter printing part 104. An air suction device 121 is provided beneath the letter printing part 104. The air suction device 121 is connected to an air compressor 133, for example, and constantly sucks air of the pocket 120a through fine holes (not shown) provided at the base of each pocket 120a. Thereby, the solid object 101 can be fixed within the pocket 120a and printed letters by the letter printing part 104.

Then, the solid object 101 is passed under a line sensor camera 1 of the printed letter inspecting apparatus 100 by the belt 103. The printed letter inspecting apparatus 100 inspects the respective letters "ABCD" printed on the surface of the solid object 101. If the printed letter inspecting apparatus 100 judges the printed letter as defective printing, the printed letter inspecting apparatus 100 issues a defective object rejecting signal for removing the solid object 101 to a computer 110.

As a result, the computer 110 makes a defective object removing part 105 operate so that the solid object 101 having defectively printed letter is removed with the defective object removing part 105. The defective object removing part 105 comprises an air gun 131, an air compressor 132 and a defective object collection bucket 134. Thereby, if the defective object removing part 105 receives the defective object rejecting signal, the air compressor 132 discharge the pressurized air to the air gun 131; and the solid object 101 is blown or struck out from the pocket 120a to the defective object collection bucket 134 by the pressurized air of the air gun 131.

When the printed letter inspecting apparatus 100 does not judge the printed letter as defective printing, the defective object rejecting signal is not issued. Thereby, the solid object 101 passes the defective object removing part 105, being fixed by means of the air suction part 122. The solid object 101 is collected in an acceptable object collection part 106.

Figure 2:
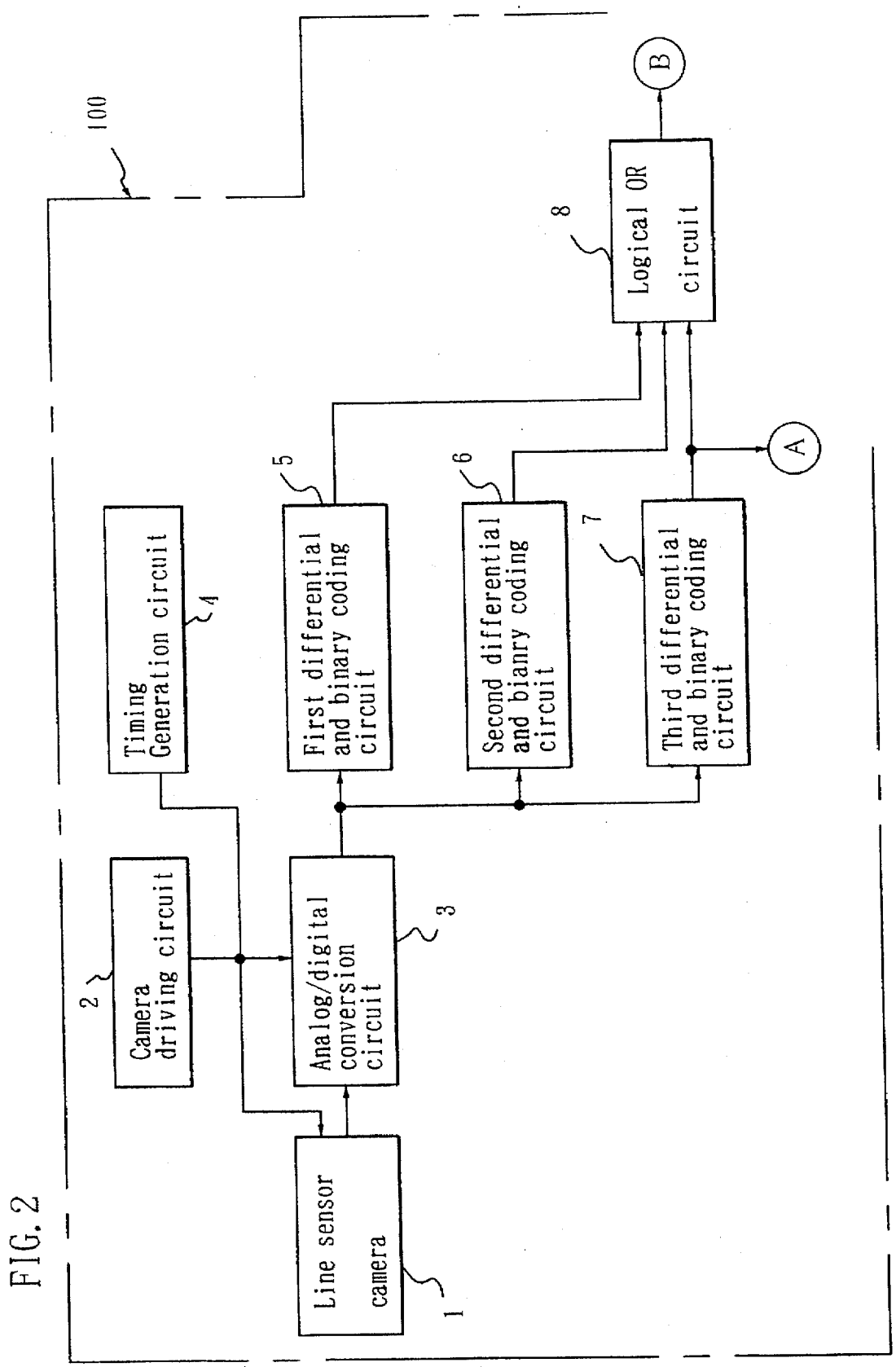
FIG. 2 is a block diagram showing the logical operation of the printed letter inspecting apparatus for the solid objects in accordance with the present invention.
Figure 3:
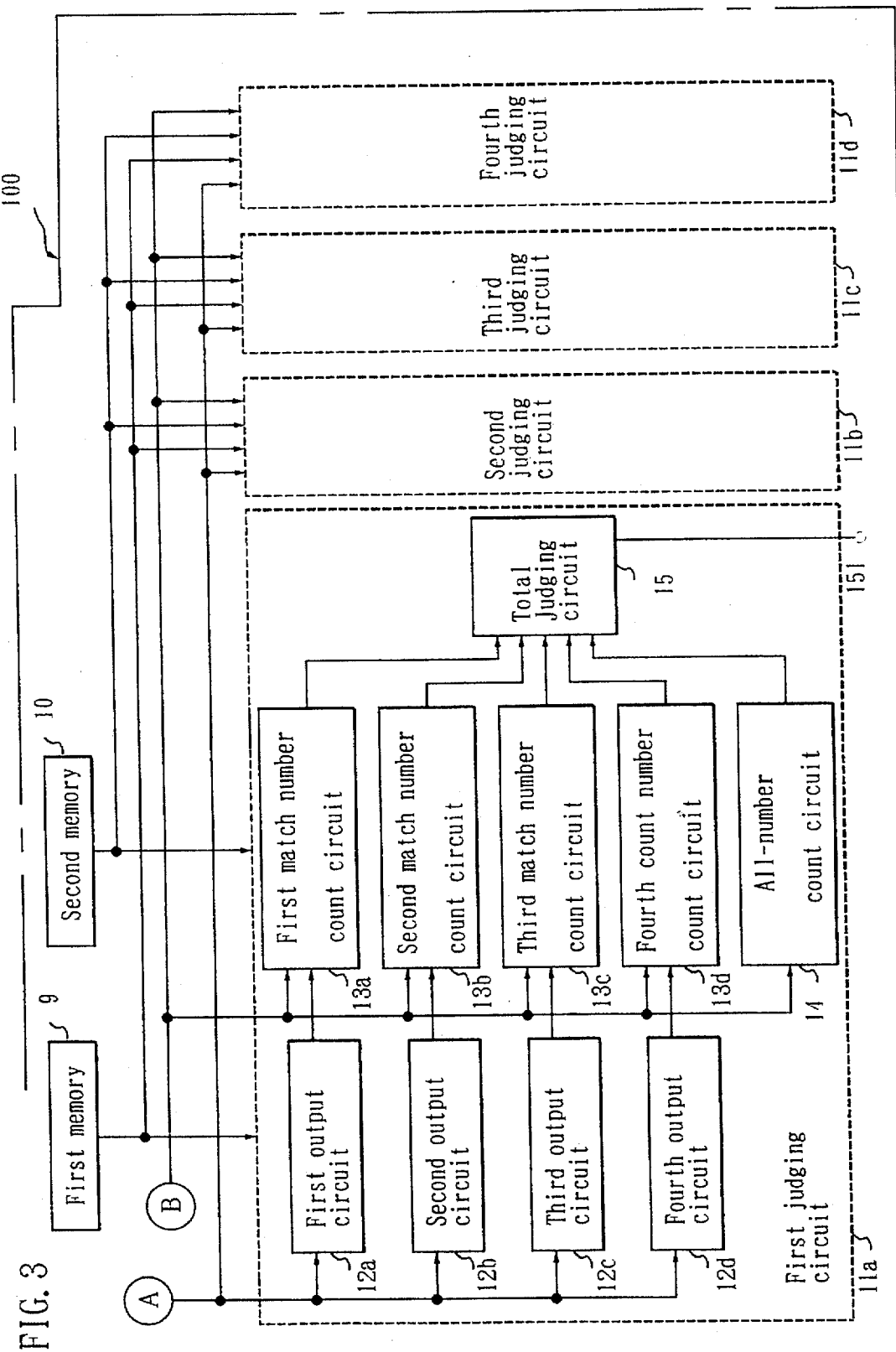
FIG. 3 is a block diagram showing the logical operation of the printed letter inspecting apparatus for the solid objects in accordance with the present invention.

Hereafter, a logical operation of the printed letter inspecting apparatus 100 in accordance with the present invention will be elucidated with reference to FIG. 2 and FIG. 3. FIG. 2 is a block diagram showing the logical operation of the printed letter inspecting apparatus for the solid objects in accordance with the present invention. FIG. 3 is a block diagram showing the logical operation of the printed letter inspecting apparatus for the solid objects in accordance with the present invention. A point "A" and a point "B" of FIG. 2 are connected to a point "A" and a point "B" of FIG. 3, respectively.

In FIG. 2, a line sensor camera 1 comprises 2048 sensors disposed in a line in the direction "X" and issues an analog signal corresponding to the reflectance on the surface of the solid object 101. The line sensor camera 1 receives a predetermined clock (4 MHz, for example) given from a camera driving circuit 2. The 2048 sensors of the line sensor camera 1 successively issues the analog signals into an analog/digital conversion circuit 3 (hereinafter referred to as A/D conversion circuit 3) in synchronism with the predetermined clock of the line sensor camera 1. In the direction "Y", the line sensor camera 1 receives a timing signal issued from a timing generation circuit 4; and the number of scanning of the line sensor camera 1 is decided by the timing generation circuit 4. The line sensor camera 1, the camera driving circuit 2 and the timing generation circuit 4 form a surface scanning means of the printed letter inspecting apparatus for the solid object.

The A/D conversion circuit 3 converts the analog signal given from the line sensor camera 1 into an 8-bit digital signal (hereinafter referred to as the digital signal), in which the reflectance is divided into 256 levels. The digital signal, which is synchronized with the predetermined clock of the line sensor camera 1, is issued from the A/D conversion circuit 3 to a first differential and binary coding circuit 5, a second differential and binary coding circuit 6 and a third differential and binary coding circuit 7, simultaneously.

Figure 4:
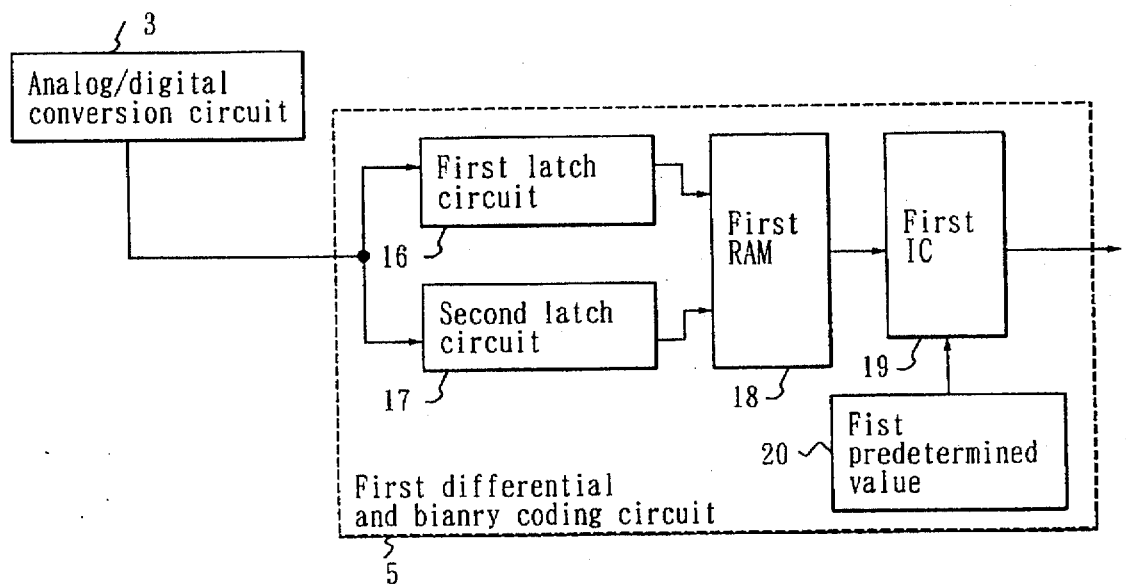
FIG. 4 is a block diagram showing a concrete structure of the first differential and binary coding circuit.
Figure 5A:
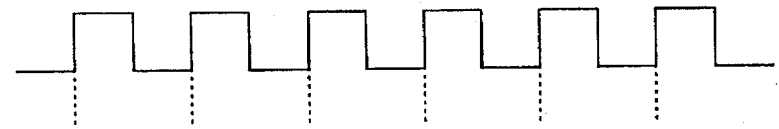
FIG. 5A is a wave form chart showing a clock signal of the line sensor camera.
Figure 5B:
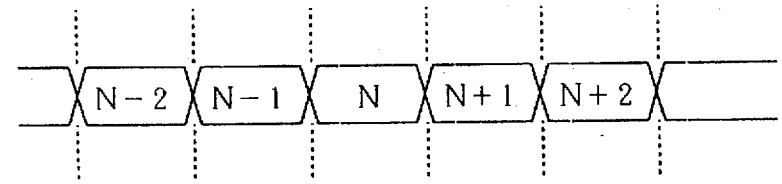
FIG. 5B is a wave form chart showing a digital signal issued from the A/D conversion circuit.
Figure 5C:
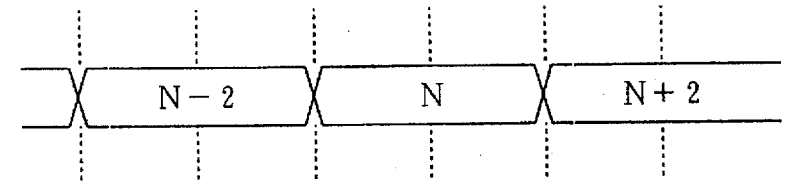
FIG. 5C is a wave form chart showing a digital signal in a first latch circuit.
Figure 5D:
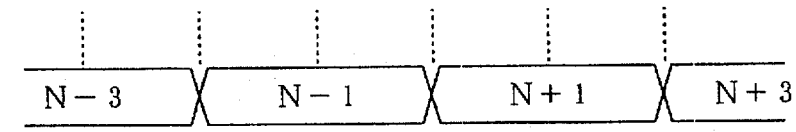
FIG. 5D is a wave form chart showing a digital signal in a second latch circuit.

The first differential and binary coding circuit 5 is elucidated in the following with reference to FIG. 4, FIG. 5A, FIG. 5B, FIG. 5C and FIG. 5D. FIG. 4 is a block diagram showing a concrete structure of the first differential and binary coding circuit. FIG. 5A is a wave form chart showing a clock signal of the line sensor camera. FIG. 5B is a wave form chart showing a digital signal issued from the A/D conversion circuit. FIG. 5C is a wave form chart showing a digital signal in a first latch circuit. FIG. 5D is a wave form chart showing a digital signal in a second latch circuit. FIG. 5A through FIG. 5D are drawn with their timing positions (represented by vertical broken lines) in agreement with each other.

As shown in FIG. 4, one ends of the first latch circuit 16 and the second latch circuit 17 are connected to the A/D conversion circuit 3, and the other ends of the first latch circuit 16 and the second latch circuit 17 are connected to a first RAM 18. In this first differential and binary coding circuit 5, two digital signals, which are issued in succession in the direction "X", from the A/D conversion circuit 3 are alternately stored in the first latch circuit 16 and the second latch circuit 17. Simultaneously, one of the two digital signals is issued from the first latch circuit 16 to the first RAM 18, and the other of the two digital signals is issued from the second latch circuit 17 to the first RAM 18.

Namely, as shown in FIG. 5A, FIG. 5B, FIG. 5C and FIG. 5D, each of the first latch circuit 16 and the second latch circuit 17 stores the digital signal alternately, and successively issues the digital signal in synchronism with the clock signal of the line sensor camera 1.

In the first RAM 18 shown in FIG. 4, respective plural addresses preliminarily have stored absolute values of respective differences between the numerical values at the upper ports of the address and the numerical values at the lower ports of the address. One of the two digital signals is input to the upper port of the address, and the other of the two digital signals is simultaneously input to the lower port of the address. By the combination of said one digital signal and said the other digital signal, an address is specified. The absolute value of the difference between the two digital signals, which the absolute value was stored in the address as above, is instantaneously issued from the first RAM 18 as the absolute value of the first difference.

An example of the above-mentioned operation of the first RAM 18 (FIG. 4) is explained in the following lines:

(1) A digital signal "01001100" is input to the upper port of the address of the first RAM 18, and a digital signal "00101010" is simultaneously input to the lower port of the address of the first RAM 18.

(2) A numerical value of the upper port of the address is specified to "4C" (shown with hexadecimal notation) by the digital signal "01001100"; and a numerical value of the lower port of the address is specified to "2A" (shown with hexadecimal notation) by the digital signal "00101010". Therefore, the address is specified to "4C2A".

(3) An absolute value "22" (shown with hexadecimal notation) of the difference between "4C" and "2A" is stored in the address "4C2A" in advance. As a result, a digital signal "00100010", which corresponds to "22", is issued from the first RAM 18 as the absolute value of the first difference instantaneously.

Subsequently, a known first IC 19 compares the absolute value of the first difference with a first predetermined value 20. If the absolute value of the first difference is greater than the first predetermined value 20, the known first IC 19 issues a first binary-coded signal in a synchronism with the clock of the line sensor camera 1. The first differential and binary coding circuit 5, which comprises the first and the second latch circuits 16 and 17, the first RAM 18, the first IC 19 and the first predetermined value 20, forms a first differential and binary coding means of the printed letter inspecting apparatus 100 for the solid object 101. By use of this first differential and binary coding means, the electric signal corresponding to the variation of the reflectance on the surface of the solid object 101 in the direction "X" becomes distinct.

The second differential and binary coding circuit 6 is elucidated with reference to FIG. 6, FIG. 7A, FIG. 7B and FIG. 7C. FIG. 6 is a block diagram showing a concrete structure of the second differential and binary coding circuit. FIG. 7A is a wave form chart showing a clock signal of the line sensor camera. FIG. 7B is a wave form chart showing a write and a read operations of a fourth RAM. FIG. 7C is a wave form chart showing a write and a read operations of a fifth RAM. FIG. 7A through FIG. 7C are drawn with their timing positions (represented by vertical broken lines) in agreement with each other.

As shown in FIG. 6, the second differential and binary coding circuit 6 comprises a latch circuit 21, a latch circuit 25, a second RAM 29, a second IC 30 and a second predetermined value 31. In the second differential and binary coding circuit 6, the A/D conversion circuit 3 is connected to the latch circuits 21 and 25, which are disposed in parallel with each other, and the second RAM 29. Furthermore, the latch circuit 21 comprises a first three-state circuit 22, a fourth RAM 23 and a second three-state circuit 24. This latch circuit 21 is used for the 2048 digital signals which are issued from the A/D conversion circuit 3 for the period of one scanning "C" (shown in FIG. 7A) in the direction "X". Similarly, the latch circuit 25 comprises a third three-state circuit 26, a fifth RAM 27 and a fourth three-state circuit 28. This latch circuit 25 is used for the 2048 digital signals which are issued from the A/D conversion circuit 3 for the period of another scanning "D" (shown in FIG. 7A) in the direction "X".

As has been elucidated in the above, explanation, the latch circuits 21 and 25 has the same structure with each other, and comprise two three-state circuits and one RAM, respectively. In these latch circuits 21 and 25, an operation of the first three-state circuit 22 is different from an operation of the third three-state circuit 26, and an operation of the second three-state circuit 24 is different from an operation of the fourth three-state circuit 28.

Namely, when the first and the fourth three-state circuits 22 and 28 are in "OFF" state, the second and the third three-state circuits 24 and 26 are in "ON" state. Therefore, as shown in FIG. 7A, FIG. 7B and FIG. 7C, when the line sensor camera 1 scans the solid object 101 during one range of all scannings in the direction "X" such as the range "C", the latch circuit 21 reads out the digital signals from the fourth RAM 23 into the second RAM 29, and the latch circuit 25 writes the digital signals from the A/D conversion circuit 3 into the fifth RAM 27.

Contrary to the above-mentioned, when the first and the fourth three-state circuits 22 and 28 are in "ON" state, the second three-state circuit 24 and the third three-state circuit 26 are in "OFF" state. Therefore, as shown in FIG. 7A, FIG. 7B and FIG. 7C, when the line sensor camera 1 scans the solid object 101 during another range of all scannings in the direction "X" such as the range "D", the latch circuit 21 writes the digital signals from the A/D conversion circuit 3 into the fourth RAM 23, and the latch circuit 25 reads out the digital signals from the fifth RAM 27 into the second RAM 29.

The "ON/OFF" states of the above-mentioned four three-state circuits 22, 24, 26 and 28 changes to opposite states every scannings in the direction "X" of the line sensor camera 1. As a result, the operation of the latch circuit 21 is made opposite to the operation of the latch circuit 25.

As shown in FIG. 6, the second RAM 29 directly receives the digital signal, which is in an ongoing scanning operation of the line sensor camera 1, from the A/D conversion circuit 3 in a synchronism with the clock signal of the line sensor camera 1. Furthermore, as in the above-mentioned explanation, the second RAM 29 receives the digital signal, which has been issued in a previous scanning operation of the line sensor camera 1 at the direction "Y", from either the latch circuit 21 or the latch circuit 25 in synchronism with the clock signal of the line sensor camera 1.

The second RAM 29 is the same as the first RAM 18. Therefore, when the second RAM 29 simultaneously receives the above-mentioned two digital signals from the A/D conversion circuit 3 and from either one of two latch circuits 21 or 25 simultaneously, an address of the second RAM 29 is specified in a similar way with the case of the first RAM 18. Furthermore, the second RAM 29 instantaneously issues the absolute value of the difference between the data of the two digital signals, as a result of successive two scannings on a checking object moving in −Y direction. This absolute value of the difference given from the second RAM 29 is an absolute value of a second difference.

Subsequently, a known second IC 30 compares the absolute value of the second difference with the second predetermined value 31. If the absolute value of the second difference is greater than the second predetermined value 31, the known second IC 30 issues a second binary-coded signal in a synchronism with the clock of the line sensor camera 1. The second differential and binary coding circuit 6 forms a second differential and binary coding means of the printed letter inspecting apparatus 100 for the solid object 101. By use of this second differential and binary coding means, the electric signal corresponding to the variation of the reflectance on the surface of the solid object 101 in the direction "Y" becomes distinct.

The third differential and binary coding circuit 7 is elucidated with reference to FIG. 8, FIG. 9A, FIG. 9B, FIG.

9C and FIG. 9D. FIG. 8 is a block diagram showing a concrete structure of the third differential and binary coding circuit. FIG. 9A is a wave form chart showing a clock signal of the line sensor camera. FIG. 9B is a wave form chart showing a digital signal issued from the A/D conversion circuit. FIG. 9C is a wave form chart showing an instruction signal from a third memory. FIG. 9D is a wave form chart showing a digital signal in a third latch circuit. FIG. 9A through FIG. 9D are drawn with their timing positions (represented by vertical broken lines) in agreement with each other.

As shown in FIG. 8, the third differential and binary coding circuit 7 comprises a third latch circuit 32, a third memory 33, a third RAM 34, a third IC 35 and a third predetermined value 36. In the third differential and binary coding circuit 7, the A/D conversion circuit 3 is connected to the third latch circuit 32 and the third RAM 34. In this third latch circuit 32, the digital signal from the A/D conversion circuit 3 at the predetermined position is stored and successively issued to the third RAM 34 by an instruction signal from the third memory 33.

Namely, as shown in FIG. 9A, FIG. 9B, FIG. 9C and FIG. 9D, the third latch circuit 32 updates the digital signal at the predetermined position by the instruction signal from the third memory 33 in synchronism with the clock signal of the line sensor camera 1. Furthermore, the instruction signal is issued to each of the four solid objects 101 disposed making a row at every scanning of the line sensor camera 1 in the direction "X".

As shown in FIG. 8, the third RAM 34 directly receives the digital signal, which is in an ongoing scanning operation of the line sensor camera 1, from the A/D conversion circuit 3 in synchronism with the clock signal of the line sensor camera 1. Furthermore, as has been elucidated in the above, the second RAM 34 receives the digital signal, which has been issued at the predetermined position, from the third latch circuit 32 in synchronism with the clock signal of the line sensor camera 1.

The third RAM 34 has the same as the first RAM 18 and the second RAM 29. Therefore, when the third RAM 34 simultaneously receives the above-mentioned two digital signals from the A/D conversion circuit 3 and from the third latch circuit 32, an address of the third RAM 34 is specified in a similar way with the case of the first RAM 18. Furthermore, the third RAM 34 instantaneously issues the absolute value of the difference between the data of the two digital signals, as a result of the ongoing scanning operation and at the predetermined position. This absolute value of the difference given from the third RAM 34 is an absolute value of a third difference.

Subsequently, a known third IC 35 compares the absolute value of the third difference with the third predetermined value 36. If the absolute value of the third difference is greater than the third predetermined value 36, the known third IC 35 issues a third binary-coded signal in synchronism with the clock of the line sensor camera 1. The third differential and binary coding circuit 7 forms a third differential and binary coding means of the printed letter inspecting apparatus 100 for the solid object 101.

Figure 10A:
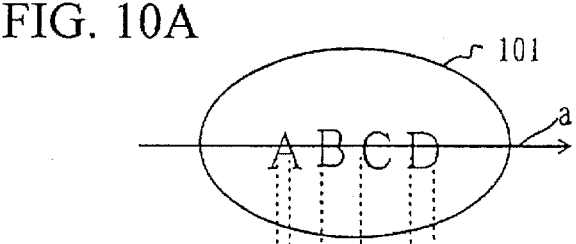
FIG. 10A is an explanatory drawing of a result of the third differential and binary coding circuit in the case that a stationary level is applied to the third RAM instead of the digital signal at the predetermined position, and a letter-printed part of the solid object is disposed in parallel with the line sensor camera.
Figure 11A:
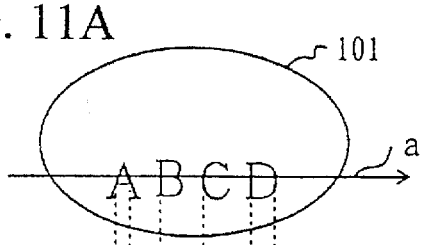
FIG. 11A is an explanatory drawing of a result of the third differential and binary coding circuit in the case that a stationary level is applied to the third RAM instead of the digital signal at the predetermined position, and a letter-printed part of the solid object deviates from the ideal top positions with respect to the line sensor camera.

In case that a stationary level is applied for the third RAM 34 instead of the digital signal at the predetermined position, a result of the third differential and binary coding circuit 7 is elucidated with reference to FIG. 10A and FIG. 11A. FIG. 10A is an explanatory drawing of a result of the third differential and binary coding circuit 7 in the case that a stationary level is applied to the third RAM 34 instead of the digital signal at the predetermined position, and a letter-printed part of the solid object 101 is disposed in parallel with the line sensor camera 1. FIG. 11A is an explanatory drawing of a result of the third differential and binary coding circuit 7 in the case that a stationary level is applied to the third RAM 34 instead of the digital signal at the predetermined position, and a letter-printed part of the solid object 101 deviates from the ideal top positions with respect to the line sensor camera 1.

Figure 10B:
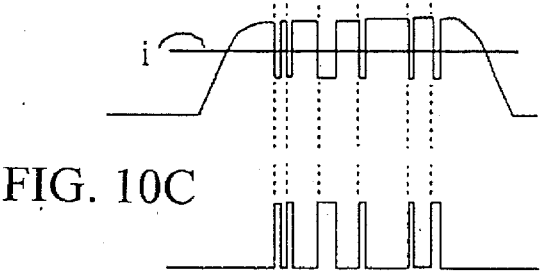
Figure 10C:

In FIG. 10A, a letter-printed part of the solid object 101 is disposed in parallel with the line sensor camera 1, and detection spots of the line sensor camera 1 scans the letter-printed part of the solid object 101 along an arrow "a". Thereby, the digital signals from the A/D conversion circuit 3 are shown in FIG. 10B. When the digital signals from the A/D conversion circuit 3 are converted to the binary-coded signals by the stationary level "i" (shown in FIG. 10B), the binary-coded signals are shown in FIG. 10C. As a result, the printed letter of the solid object 101 is correctly inspected.

Figure 11B:
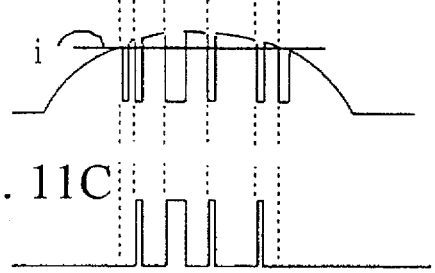
Figure 11C:

In FIG. 11A, a letter-printed part of the solid object 101 deviates from the ideal top positions with respect to the line sensor camera 1 but displaced toward a side part of the solid object 101, and detection spots of the line sensor camera 1 scans the letter-printed part of the solid object 101 along an arrow "a'". Thereby, the digital signals from the A/D conversion circuit 3 are shown in FIG. 11B, and become smaller compared with the digital signals shown in FIG. 10B because of deviation of the letter-printed part. When the digital signals from the A/D conversion circuit 3 are converted to the binary-coded signals by the stationary level "i" (shown in FIG. 11B), the binary-coded signals are shown in FIG. 11C. As a result, the printed letter of the solid object 101 is not correctly inspected. This result from that the line sensor camera 1 scans the reflectance on the printed letter of the solid object 101 induced by the downward inclination of the solid object 101 to the line sensor camera 1.

Figure 12A:
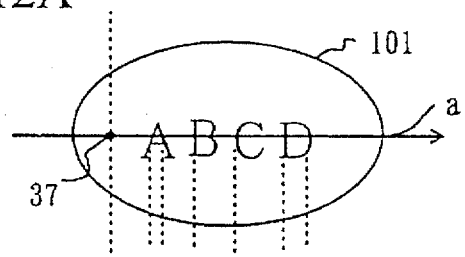
FIG. 12A is an explanatory drawing of a result of the third differential and binary coding circuit in the case that a letter-printed part of the solid object is disposed in parallel with the line sensor camera.
Figure 13A:
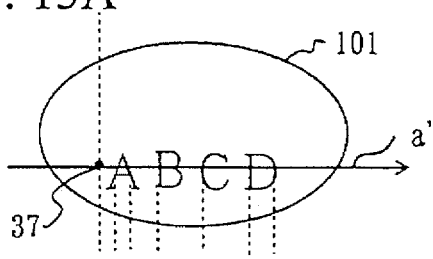
FIG. 13A is an explanatory drawing of a result of the third differential and binary coding circuit in the case that a letter-printed part of the solid object deviates from the ideal top positions with respect to the line sensor camera.

In this embodiment of the present invention, a result of the third differential and binary coding circuit 7 is elucidated with reference to FIG. 12A and FIG. 13A. FIG. 12A is an explanatory drawing of a result of the third differential and binary coding circuit 7 in the case that a letter-printed part of the solid object 101 is disposed in parallel with the line sensor camera 1. FIG. 13A is an explanatory drawing of a result of the third differential and binary coding circuit 7 in the case that a letter-printed part of the solid object 101 deviates from the ideal top positions with respect to the line sensor camera 1.

Figure 12B:
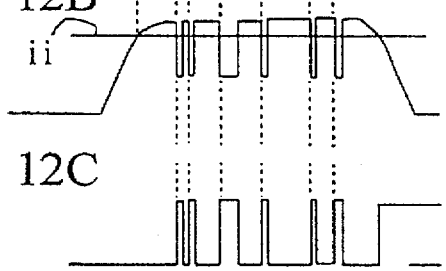
Figure 12C:

In FIG. 12A, a letter-printed part of the solid object 101 is disposed in parallel with the line sensor camera 1, and detection spots of the line sensor camera 1 scans the letter-printed part of the solid object 101 along an arrow "a". Thereby, the digital signals from the A/D conversion circuit 3 are shown in FIG. 12B. When the digital signals from the A/D conversion circuit 3 are converted to the binary-coded signals by a slice level "ii" (shown in FIG. 12B), which is a digital signal at a predetermined position 37 (shown in FIG. 12A), the third binary-coded signal issued from the third IC 35 has the waveform as shown in FIG. 12C. As a result, the printed letter of the solid object 101 is correctly inspected.

Figure 13B:
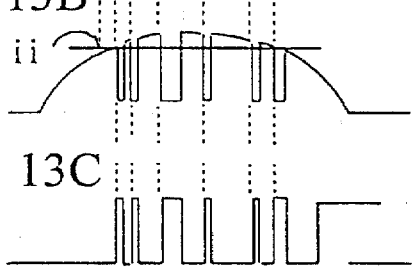
Figure 13C:
Figure 16:
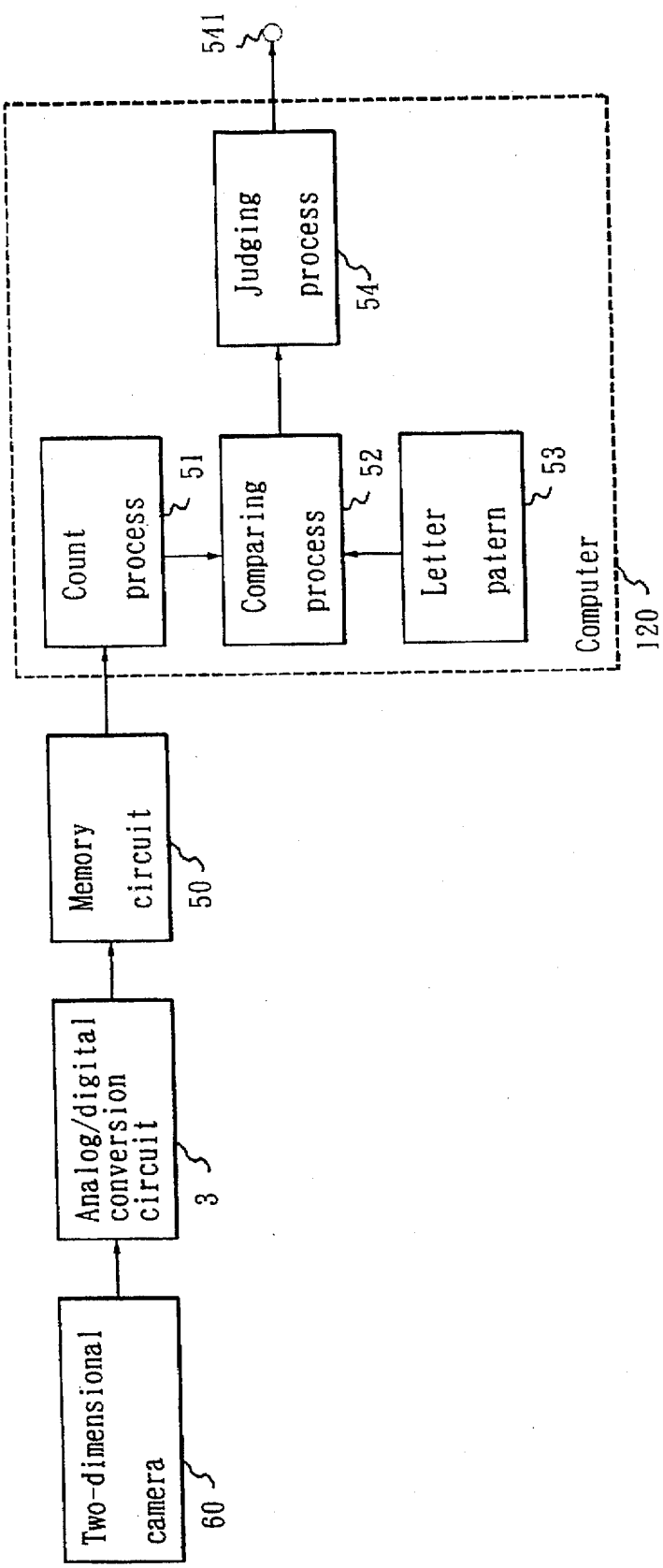
FIG. 16 is an explanatory drawing of an inspection process of a conventional printed letter inspecting apparatus for solid objects.

In FIG. 13A, a letter-printed part of the solid object 101 deviates from the ideal top positions with respect to the line sensor camera 1 but displaced toward a side part of the solid object 101, and detection spots of the line sensor camera 1 scans the letter-printed part of the solid object 101 along an arrow "a'". Thereby, the digital signals from the A/D conversion circuit 3 are shown in FIG. 13B, and become smaller compared with the digital signals shown in FIG. 12B because of deviation of the letter printed part. However, the predetermined position 37 exists on the arrow (shown in FIG. 13A) shown a scanning direction. Therefore, when the digital signals from the A/D conversion circuit 3 are converted to the binary-coded signals by a slice level "ii" (shown in FIG. 13B), which is a digital signal at a predetermined position 37 (shown in FIG. 13A), the third binary-coded signal issued from the third IC 35 has the waveform as shown in FIG. 13C. As a result, even if the letter printed part of the solid object 101 deviates from the ideal top positions with respect to the line sensor camera 1, the printed letter of the solid object 101 is correctly inspected.

This function is specifically effective for the rugbyball-shaped solid object or the like.

As shown in FIG. 2, the first differential and binary coding circuit 5, the second differential and binary coding circuit 6 and the third differential and binary coding circuit 7 are connected to a logical OR circuit 8, respectively. This logical OR circuit 8 takes the logical OR of the first, the second and the third binary-coded signals issued from the above-mentioned first, second and third differential and binary coding circuits 5, 6 and 7, respectively. The logical OR circuit 8 issues a fourth signal synchronized with the clock of the line sensor camera 1.

As shown in FIG. 3, the third differential and binary coding circuit 7 and the logical OR circuit 8 are connected to a first judging circuit 11a, a second judging circuit 11b, a third judging circuit 11c and a fourth judging circuit 11d, respectively.

These four judging circuits 11a, 11b, 11c and 11d are configured in the same structure. Four judging circuits 11a, 11b, 11c and 11d judge the printed letters of four solid objects 101 aligned in the direction "X", respectively. A concrete structure of the first judging circuit 11a is shown in FIG. 3; and the explanations of the second, the third and the fourth judging circuits 11b, 11c and 11d are omitted because they are substantially the same as that of the first judging circuit 11a.

The third binary-coded signals and the fourth signals are distributed to the respective four judging circuits 11a, 11b, 11c and 11d by instruction signals from a first memory 9.

The third differential and binary coding circuit 7 is connected to a first output circuit 12a, a second output circuit 12b, a third output circuit 12c and a fourth output circuit 12d. These four output circuits 12a, 12b, 12c and 12d are configured in the same structure, for example, the first output circuit 12a, which is used for the printed letter "A", is explained.

These four output circuits 12a, 12b, 12c and 12d are assigned to four positions, or four scanning coverages (shown in FIG. 14), which are defined by instruction signals from a second memory 10 (FIG. 3), of four printed letters on the solid object 101, respectively. FIG. 14 is an explanatory drawing of four scanning coverages, which are defined by a second memory, for respective four output circuits. Namely, in the direction "X", four scanning coverages of the printed letters "A", "B", "C" and "D" are defined four coverage "a", "b", "c" and "d" shown in FIG. 14, respectively. In the direction "Y", four scanning coverages of the printed letters "A", "B", "C" and "D" are defined a coverage "e" shown in FIG. 14.

Firstly, the first output circuit 12a counts number of the third binary-coded signal issued from the third differential and binary coding circuit 7. When the counted number gets to a fourth predetermined value, the first output circuit 12a judges that the beginning of the printed letter "A" is existed in a position of the counted number "1".

Second, the first output circuit 12a issues binary-coded signals of letter pattern, which have been preliminarily stored in a memory of the first output circuit 12a and correspond to the printed letter "A", in synchronism with next scanning operation of the line sensor camera 1 in the direction "X".

Data of the binary-coded signals of letter pattern corresponding to the beginning (left lower end part) of the printed letter "A" in the scanning operation of the direction "X" is not recorded in the memory of the first output circuit 12a. Therefore, the first output circuit 12a issues the binary-coded signals of letter pattern eliminating from making a difference against the printed letter "A".

A concrete operation of the first output circuit 12a for the printed letter "A" will be elucidated with reference to FIG. 15A, FIG. 15B, FIG. 15C, FIG. 15D and FIG 15.E. FIG. 15A is an explanatory drawing of scanning operation of the line sensor camera for the printed letter "A". FIG. 15B is a wave form chart showing the clock signal of the line sensor camera. FIG. 15C is a wave form chart showing the third binary-coded signals in case that the line sensor camera scans on an arrow "a" shown in FIG. 15A. FIG. 15D is a wave form chart showing the third binary-coded signals in case that the line sensor camera scans on an arrow "b" shown in FIG. 15A. FIG. 15E is a wave form chart showing the third binary-coded signals in case that the line sensor camera scans on an arrow "c" shown in FIG. 15A. FIG. 15A through FIG. 15E are drawn with their timing positions (represented by vertical broken lines) in agreement with each other.

As shown in FIG. 15.A, the line sensor camera 1 scans the scanning coverage of the printed letter "A" on arrows "a", "b" and "c" in that order in synchronism with the clock signal of the line sensor camera 1 shown in FIG. 15B.

Even if there is an undesirable ink stain 39 when the line sensor camera 1 scans on the arrow "a" shown in FIG. 15A, such ink stain 39 is not recognized as the beginning of the printed letter "A". The reason is as follows. The wave form of the third binary-coded signals issued from the third differential and binary coding circuit 7 is shown in FIG. 15C. The first output circuit 12a counts one during width of the range of "d" (shown in FIG. 15C) of the third binary-coded signals. However, the counted number does not get to the fourth predetermined value (for example, three count). Therefore, the first output circuit 12a (FIG. 3) does not judge the undesirable ink stain 39 as the beginning of the printed letter "A".

When the line sensor camera 1 scans on the arrow "b" shown in FIG. 15A, a part 38 of the printed letter "A", which is correctly printed, is detected. Thereby, the wave form of the third binary-coded signals issued from the third differential and binary coding circuit 7 is shown in FIG. 15D. The first output circuit 12a (FIG. 3) counts three during width of the range of "e" (shown in FIG. 15C) of the third binary-coded signals. The counted number get to the fourth predetermined value. Therefore, the first output circuit 12a judges that the beginning of the printed letter "A" is in a position of the counted number "1". Namely, the first output circuit 12a judges a point 40 as the beginning of the printed letter "A".

When the line sensor camera 1 scans on the arrow "c" shown in FIG. 15A, a part 38 of the printed letter "A", which is correctly printed, is detected. Thereby, the wave form of the third binary-coded signals issued from the third differential and binary coding circuit 7 is shown in FIG. 15E. The first output circuit 12a issues binary-coded signals of letter pattern, which have preliminarily stored and correspond to the printed letter "A", in synchronism with next scanning operation of the line sensor camera 1 in the direction "X" in view of a difference "f" (shown in FIG. 15E) between the point 40 and a point 41.

As shown in FIG. 3, output end of the four output circuits 12a, 12b, 12c and 12d are connected to respective one ends of four match number count circuits 13a, 13b, 13c and 13d so as to correspond to the printed letter "A", "B", "C" and "D", respectively. Namely, the first output circuit 12a is connected to the first match number count circuit 13a, and the second output circuit 12b is connected to the second match number count circuit 13b. The third output circuit 12c is connected to the third match number count circuit 13c, and the fourth output circuit 12d is connected to the fourth match number count circuit 13d. These four match number count circuits 13a, 13b, 13c and 13d are configured in the same structure, for example, as the first match number count circuit 13a, which is used for the printed letter "A", is explained.

The first match number count circuit 13a receives the fourth signal issued from the logical OR circuit 8 (FIG. 2) and the binary-coded signals of letter pattern issued from the first output circuit 12a in synchronism with the clock signal of the line sensor camera 1. When the first match number count circuit 13a simultaneously receives the fourth signal and the binary-coded signals of letter pattern, the first match number count circuit 13a counts a match number between the fourth signal and the binary-coded signals of letter pattern.

If the match number is greater than a fifth predetermined value, the first match number count circuit 13a judges that letter "A" is correctly printed to the solid object 101. Furthermore, the first match number count circuit 13a issues a fifth signal to a total judging circuit 15 in synchronism with the clock signal of the line sensor camera 1.

As shown in FIG. 2 and FIG. 3, an all-number count circuit 14 is connected to the logical OR circuit 8, and counts number of the fourth signal issued from the logical OR circuit 8. If number of the fourth signal is smaller than a sixth predetermined value, the all-number count circuit 14 judges that there are no slippage of printed letters and the undesirable ink stain and the like on the solid object 101. Furthermore, the all-number count circuit 14 issues a sixth signal to the total judging circuit 15 in synchronism with the clock signal of the line sensor camera 1.

As shown in FIG. 3, the total judging circuit 15 is connected to the above-mentioned four match number count circuits 13a, 13b, 13c and 13d and the all-number count circuit 14. Furthermore, the total judging circuit 15 is connected to the computer 110 (shown in FIG. 1) via an output terminal 151. If the total judging circuit 15 does not receive one of the fifth signals and sixth signal issued from the above-mentioned four match number count circuits 13a, 13b, 13c and 13d and the all-number count circuit 14, the total judging circuit 15 judges the printed letter of the solid object as defective printing. Furthermore, the total judging circuit 15 issues the defective object rejecting signal to the computer 110 (shown in FIG. 1) via the output terminal 151 in synchronism with the clock signal of the line sensor camera 1. This defective object rejecting signal is a seventh signal. Each of the four judging circuits 11a, 11b, 11c and 11d forms a judging means of the printed letter inspecting apparatus 100 for the solid object 101.

As aforementioned explanation, the computer 110 makes the defective object removing 105 operate so that the solid object 101 having defectively printed letter is struck out with the defective object removing part 105.

In this printed letter inspecting apparatus 100 for the solid object 101, it is possible that real-time processing for inspecting and judging is achieved by the following two advantage features:

(1) The first, the second and the third RAMs 18, 29 and 34 (FIGS. 4, 6 and 8) respectively have plural addresses, which are absolute values of respective differences between the numerical values at the upper ports of the address and the numerical values at the lower ports of the address and preliminarily have been stored in the RAMs. These RAMs 18, 29 and 34 are used for the three differential and binary coding circuits 5, 6 and 7, respectively. Therefore, when the upper port of the address receives one of two digital signals issued from the A/D conversion circuit 3, and the lower port of the address simultaneously receives the other of two digital signals issued from the A/D conversion circuit 3, each of the three RAMs 18, 29 and 34 instantaneously issues the absolute values of the difference between the two digital signals.

(2) In the judging means, the first output circuit 12a, for example, judges the beginning of the printed letter "A" and issues the binary-coded signals of letter pattern, which have preliminarily stored and correspond to the printed letter "A", to the first match number count circuit 13a in synchronism with next scanning operation of the line sensor camera 1 in the direction "X". Therefore, the first match number count circuit 13a counts the match number between the binary-coded signals of letter pattern "A" and the fourth signal issued from the logical OR circuit 8 in synchronism with the clock signal of the line sensor camera 1.

In the printed letter inspecting apparatus of the present invention, it is possible to complete a real-time processing for inspecting and judging within one clock period of the line sensor camera 1, because the computer is not used in the present invention. In this embodiment of the present invention, the three binary-coded signals are issued from the respective three differential and binary coding circuit 5, 6 and 7 to the logical OR circuit 8 with delay of one clock period of the line sensor camera 1 so that the logical OR circuit 8 simultaneously receives the three binary-coded signals.

Although the present invention has been described in terms of the presently preferred embodiment, it is to be understood that such disclosure is not to be interpreted as limiting. Various alternations and modifications will no doubt become apparent to those skilled in the art after having read the above disclosure. Accordingly, it is intended that the appended claims be interpreted as covering all alternations and modifications as fall within the true spirit and scope of the invention.

What is claimed is:

1. A printed letter inspecting apparatus for solid objects comprising:

surface scanning means disposed above a part of a carrier apparatus which horizontally carries solid objects placed on a plane, said surface scanning means scanning a surface of said solid objects in synchronism with a predetermined clock in one direction which is perpendicular to a carrying direction of said carrier apparatus at a sufficiently fast rate in comparison with speed of carrying of said carrier, said surface scanning means issuing an analog signal in synchronism with said predetermined clock, analog/digital conversion means for converting said analog signal from said surface scanning means into a digital signal in synchronism with said predetermined clock, at least one differential and coding means having a RAM for issuing an absolute value of a difference between one digital signal being obtained by an ongoing scanning operation of said surface scanning means, and another digital signal, which is stored in a memory, being obtained from said analog/digital conversion in synchronism with said predetermined clock, said differential and coding means comparing said absolute value of said difference with a first predetermined value and issuing a coded signal in synchronism with said predetermined clock when said absolute value of said difference is greater than said predetermined value, and judging means each comprising an output circuit, a match number count circuit, an all-number count circuit and a total judging circuit;

said output circuit for judging a beginning position of said printed letters based on a counting number of said coded signal, and for issuing preliminarily stored coded signals of a letter pattern in synchronism with a next scanning of said surface scanning means when said counting number of said coded signal reaches a fourth predetermined value, said match number count circuit for judging whether said printed letters are correctly printed to said solid objects by counting a match number between said coded signal from said differential and coding means and said preliminary stored coded signals from said output circuit, and for issuing an output signal in synchronism with said predetermined clock when said match number is greater than a fifth predetermined value, said all-number count circuit for judging whether there is slippage of printed letters or ink stains on said solid objects by counting a number of said coded signal from said differential and coding means, and for issuing an output signal in synchronism with said predetermined clock when said number of said coded signal is smaller than a sixth predetermined value, and said total judging circuit for judging whether said printed letters are defectively printed based on said output signals of said match number count circuit and said all-number count circuit, and for issuing an output signal, the analog/digital conversion means, the differential and coding means and the judging means operating independent of a commonly linked processor.

2. A printed letter inspecting apparatus for solid objects in accordance with claim 1, wherein said RAM has plural addresses preliminarily storing absolute values of respective differences between numerical values at upper ports of said address and numerical values at lower ports of said address, and said upper ports of said address receives one of said digital signals; and said lower ports of said address simultaneously receives the other of said digital signals.

3. A printed letter inspecting apparatus for solid objects comprising:

surface scanning means disposed above a part of a carrier apparatus which horizontally carries solid objects placed on a plane, said surface scanning means scanning a surface of said solid objects in synchronism with a predetermined clock in one direction which is perpendicular to a carrying direction of said carrier apparatus, and said surface scanning means issuing an analog signal in synchronism with said predetermined clock, analog/digital conversion means for converting said analog signal from said surface scanning means into a digital signal in synchronism with said predetermined clock, a first differential and coding means having a first RAM, said first RAM issuing an absolute value of a first difference between two digital signals which are issued in succession in a scanning direction of said surface scanning means in synchronism with said predetermined clock, one digital signal being obtained by an ongoing scanning operation of said surface scanning means, the other digital signal, which is stored in a memory, being obtained from said analog/digital conversion in synchronism with said predetermined clock, said first differential and coding means comparing said absolute value of said first difference with a first predetermined value and, said first difference and coding means issuing a first coded signal in synchronism with said predetermined clock when said absolute value of said first difference is greater than said first predetermined value, second differential and coding means having a second RAM, said second RAM issuing an absolute value of a second difference between data of two digital signals created as a result of successive scanning of said surface scanning means in said carrying direction of said carrier apparatus in synchronism with said predetermined clock, one digital signal being obtained by an ongoing scanning operation of said surface scanning means, the other digital signal, which is stored in a memory, being obtained from said analog/digital conversion in synchronism with said predetermined clock, said second differential and coding means comparing said absolute value of said second difference with a second predetermined value and, said second differential and coding means issuing a second coded signal in synchronism with said predetermined clock when said absolute value of said second difference is greater than said second predetermined value, third differential and coding means having a third RAM, said third RAM issuing an absolute value of a third difference between data of two digital signals created as a result of the ongoing scanning operation and at the predetermined position in synchronism with said predetermined clock, one digital signal being obtained by the ongoing scanning operation of said surface scanning means, the other digital signal, which is stored in a memory, being obtained from said analog/digital conversion in synchronism with said predetermined clock, said third differential and coding means comparing said absolute value of said third difference with a third predetermined value and, said third differential and coding means issuing a third coded signal in synchronism with said predetermined clock when said absolute value of said third difference is greater than said third predetermined value, logical OR means for taking a logical OR of said first coded signal, said second coded signal and said third coded signal, and for issuing a fourth signal in synchronism with said predetermined clock and, judging means having an output circuit, a match number count circuit, an all-number count circuit and a total judging circuit, said output circuit for judging a beginning position of said printed letters based on a counting number of said third coded signal, and for issuing coded signals of a letter pattern, which have been preliminarily stored in synchronism with a next scanning of said surface scanning means when said number of said third coded signal reaches a fourth predetermined value, said match number count circuit for judging whether there is slippage of printed letters or ink stains on said solid objects by counting a match number between said fourth signal and said coded signals of a letter pattern when said match number count circuit simultaneously receives said fourth signal and said coded signals of a letter pattern, and for issuing a fifth signal in synchronism with said predetermined clock when said match number is greater than a fifth predetermined value, said all-number count circuit for judging whether there is slippage of printed letters or ink stains on said solid objects by counting a number of said fourth signal, and for issuing a sixth signal in synchronism with said predetermined clock when said number of said fourth signal is smaller than a sixth predetermined value and, said total judging circuit for issuing a seventh signal in synchronism with said predetermined clock when said total judging means does not receive one of said fifth signal and said sixth signal, said total judging circuit for judging whether said printed letters are defectively printed, the analog/digital conversion means, the first, second and third differential and coding means and the judging means operating independent of a commonly linked processor.

4. A printed letter inspecting apparatus for solid objects in accordance with claim 3, wherein each of said first RAM, said second RAM and said third RAM has plural addresses preliminarily storing absolute values of respective differences between numerical values at upper ports of said address and numerical values at lower ports of said address, and said upper ports of said address receive one of said digital signals, and said lower ports of said address simultaneously receive the other one of said digital signals.

* * * * *